US012730776B2

(12) United States Patent
Choudhury et al.

(10) Patent No.: US 12,730,776 B2
(45) Date of Patent: Sep. 8, 2026

(54) DATABASE AWARE, SPACE EFFICIENT, HIGH PERFORMANCE, SNAPSHOTS ON HYPER-SCALE DISTRIBUTED STORAGE

(71) Applicant: Oracle International Corporation, Redwood Shores, CA (US)

(72) Inventors: Nilesh Choudhury, Redwood City, CA (US); Krishnan Meiyyappan, Fremont, CA (US); Semen Ustimenko, Sunnyvale, CA (US); Boris Erlikhman, Mountain View, CA (US); Siddharth Choudhary, Redwood City, CA (US); Scott Martin, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/885,231

(22) Filed: Sep. 13, 2024

(65) Prior Publication Data

US 2025/0094384 A1 Mar. 20, 2025

Related U.S. Application Data

(60) Provisional application No. 63/583,192, filed on Sep. 15, 2023.

(51) Int. Cl.

| | |
|---|---|
| ***G06F 16/11*** | (2019.01) |
| ***G06F 16/174*** | (2019.01) |
| ***G06F 16/22*** | (2019.01) |
| ***G06F 16/27*** | (2019.01) |

(52) U.S. Cl.
CPC ........ *G06F 16/128* (2019.01); *G06F 16/1744* (2019.01); *G06F 16/2246* (2019.01); *G06F 16/27* (2019.01)

(58) Field of Classification Search
CPC ............... G06F 16/128; G06F 16/1744; G06F 16/2246; G06F 16/27; G06F 16/273; G06F 16/275; G06F 16/278
USPC .......................................................... 707/639
See application file for complete search history.

(56) References Cited

U.S. PATENT DOCUMENTS

2017/0116220 A1* 4/2017 Wong ................. G06F 11/1471

* cited by examiner

*Primary Examiner* — Michael Pham
(74) *Attorney, Agent, or Firm* — Hickman Becker Bingham Ledesma LLP

(57) ABSTRACT

A database-aware storage server provides instant creation of snapshots without the need to create an intermediate test master database. During the snapshot creation time, the source database stays read-write and completes ongoing reads and writes. The database-aware storage server allows creation of layers of writable snapshots in a hierarchy. All these multiple databases share common data blocks. Any new writes performed by the database post snapshot are stored in blocks of sparse files. This promotes space sharing and reduces the total amount of space used by all these related databases. The allocations for the source and all new snapshot databases share the same common pool of storage. The newly created snapshot databases can access the data store directly without going through an intermediate layer.

20 Claims, 6 Drawing Sheets

600
MAIN MEMORY 606
ROM 608
STORAGE DEVICE 610
BUS 602
PROCESSOR 604
COMMUNICATION INTERFACE 618
NETWORK LINK
620
LOCAL NETWORK 622
HOST 624
ISP
626
INTERNET
628
SERVER 630
DISPLAY 612
INPUT DEVICE 614
CURSOR CONTROL 616

Figure 7:
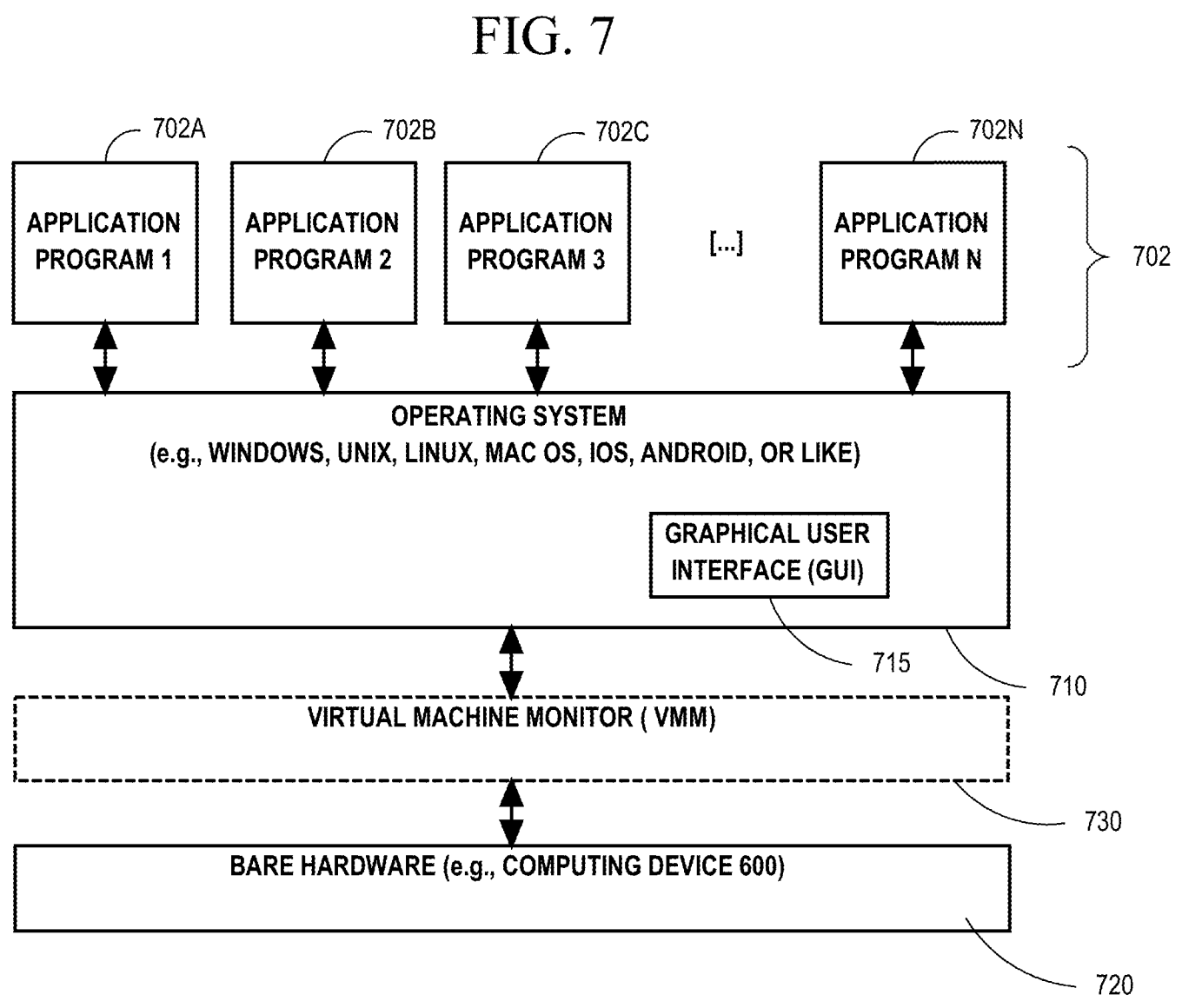

702A
APPLICATION PROGRAM 1

702B
APPLICATION PROGRAM 2

702C
APPLICATION PROGRAM 3

[...]

702N
APPLICATION PROGRAM N

710
OPERATING SYSTEM
(e.g., WINDOWS, UNIX, LINUX, MAC OS, IOS, ANDROID, OR LIKE)

715
GRAPHICAL USER INTERFACE (GUI)

730
VIRTUAL MACHINE MONITOR ( VMM)

720
BARE HARDWARE (e.g., COMPUTING DEVICE 600)

DATABASE AWARE, SPACE EFFICIENT, HIGH PERFORMANCE, SNAPSHOTS ON HYPER-SCALE DISTRIBUTED STORAGE

CROSS-REFERENCE TO RELATED APPLICATIONS; BENEFIT CLAIM

This application claims the benefit of Provisional Application No. 63/583,192, filed Sep. 15, 2023, the entire contents of which is hereby incorporated by reference as if fully set forth herein, under 35 U.S.C. § 119(e).

FIELD OF THE INVENTION

The present disclosure relates to a database-aware storage server for providing space-efficient and high-performance snapshot databases.

BACKGROUND

With traditional storage, data is transferred to the database server for processing. In contrast, a database-aware storage server provides database-aware storage services, such as the ability to offload SQL and other database processing from the database server, while remaining transparent to the SQL processing and database applications. Database-aware storage servers process data at the storage level and pass only what is needed to the database servers. Some database processing is offloaded from the database server to the storage servers.

A database-aware storage architecture is a unique storage architecture, where database clients are allowed to do remote direct memory access (RDMA) input/output and smart database offload operations directly to the location of the data. It is also a fully distributed storage architecture. This presents unique challenges in the ability to create snapshots on an existing database that is still open for direct read/write RDMA access. Current database-aware storage server solutions do not provide the ability to create instant snapshot databases from a source database that is open for write operations. Current solutions do not allow users to create snapshot databases directly on the source production databases without creation of a separate test master database, which requires duplicate storage resources. Furthermore, such a solution would require constant refreshes of the test master to the source database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 7 is a block diagram of a basic software system that may be employed for controlling the operation of computer system upon which aspects of the illustrative embodiments may be implemented.

DETAILED DESCRIPTION

Figure 1:
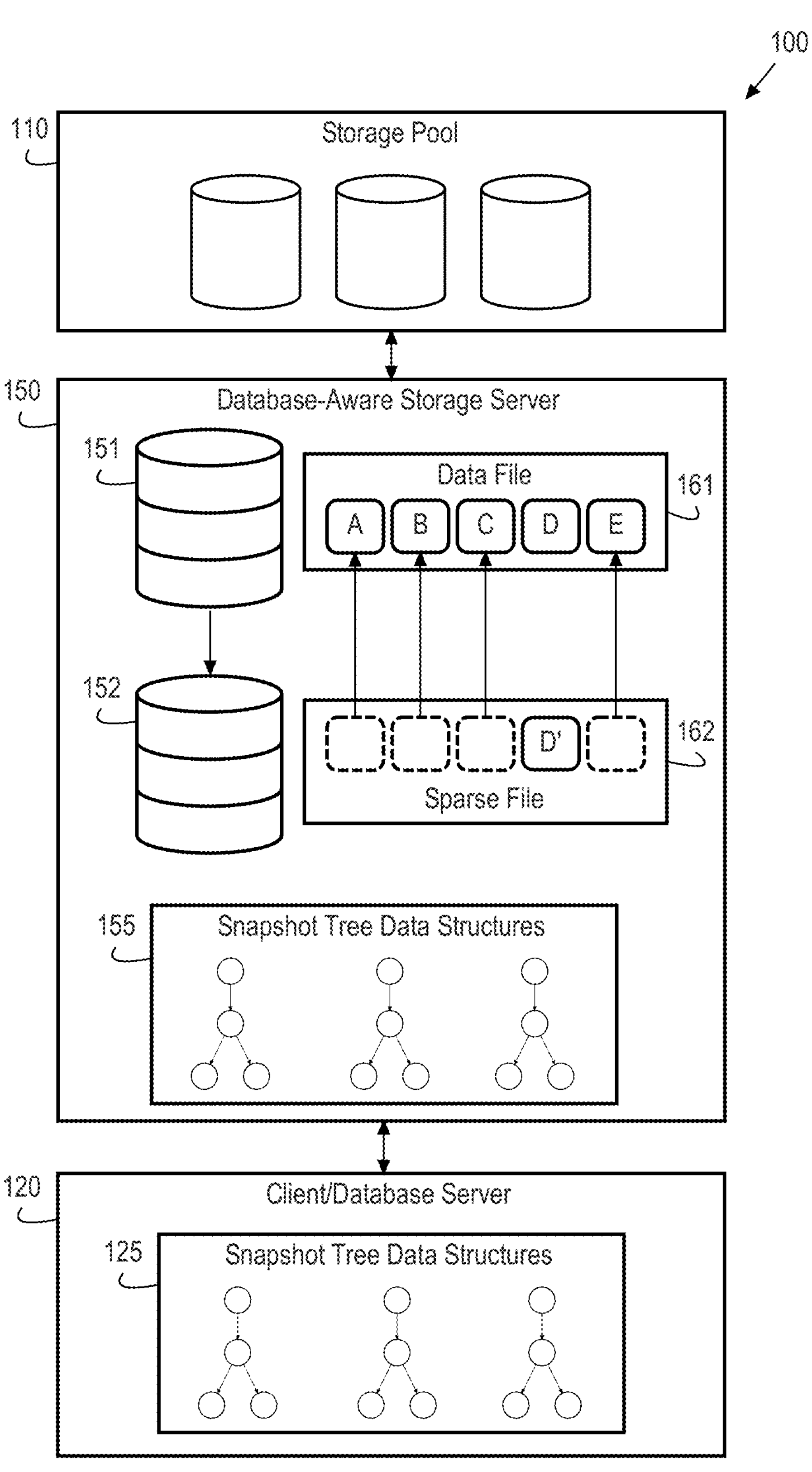
FIG. 1 is a block diagram of a database system with a database-aware storage server for creating space-efficient, high-performance snapshot databases using distributed storage in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a database-aware storage server on distributed, hyper-scale cloud storage with the ability to create an instant snapshot database from a source database that is open for write operations. The database-aware storage server provides high-performance space sharing that does not require partitioned storage space. This ensures that users can create snapshot databases directly on the source production database without creating a separate test master database, which would require duplicate storage resources or refresh of the test master database to the source database.

The illustrative embodiments provide instant snapshot creation while the source is in read-write mode and is performing reads and writes. The database-aware storage server tracks all files related to a database or pluggable database and has the ability to create a point-in-time consistent snapshot. A pluggable database (PDB) is a portable collection of schemas, schema objects, and non-schema objects. The database-aware storage server uses this to track various properties of databases, including storage space. The database-aware storage server of the illustrative embodiments co-locates a database and its snapshot allocations and handles consistency of ongoing input/output operations during creation of snapshots and during storage failure handling. Furthermore, the database-aware storage server of the embodiments provides this functionality in a hyper-scale, distributed, database-aware, high-performance system.

The database-aware storage server of the illustrative embodiments provides instant creation of read-only snapshots and instant creation of writable snapshots without the need to create an intermediate test master database. During the snapshot creation time, the source database stays read-write and completes ongoing reads and writes. The database-aware storage server of the illustrative embodiments allows creation of layers of writable snapshots in a hierarchy. All these multiple databases share common data blocks. Any new writes performed by the database post snapshot is private to them. This promotes space sharing and reduces the total amount of space used by all these related databases. The allocations for the source and all new snapshot databases share the same common pool of storage. The newly created snapshot databases can access the data store directly without going through an intermediate layer, delivering high performance.

The database-aware storage server of the embodiments allows the source database to be open for read operations and write operations during the period when snapshots are being created. Furthermore, the database-aware storage server of the embodiments provides space-efficient allocations with no space partitioning between source and snapshots. The database-aware storage server of the illustrative embodiments also provides high performance for input/output operations and database offloaded operations on both source and snapshots. In addition, the database-aware storage server of the illustrative embodiments provides direct remote direct memory access (RDMA) access of blocks of the source database and the snapshot database from the database server. The database-aware storage server of the illustrative embodiments supports thousands of hierarchical snapshot databases per database.

Database-Aware Storage Server

A database-aware storage architecture is a unique storage architecture, where database clients are allowed to do RDMA input/output and smart database offload operations directly to the location of the data. It is also a fully distributed storage architecture. This presents unique challenges in the ability to create snapshots.

FIG. 1 is a block diagram of a database system with a database-aware storage server for creating space-efficient, high-performance snapshot databases using distributed storage in accordance with an embodiment. Database system 100 includes storage pool 110, database-aware storage server 150, and client or database server 120. In some embodiments, storage pool 110 is a distributed storage system comprising a collection of pool disks or other storage devices that provides persistent storage devices for databases and files. Storage pool 110 allows different users and databases to share a large pool of storage while ensuring that data is inaccessible to users without the appropriate privileges.

The distributed storage architecture keeps track of all files that belong to a database or a pluggable database. It also tracks the type of each database file. The distributed file store can create a writable snapshot on a single file, while the source file is open for read and write operations. It also has the ability to do this on a collection of files. With the knowledge of a collection of files that form a database (container) or pluggable database, a database snapshot can be created.

Database-aware storage server 150 provides database-aware storage services, such as the ability to offload SQL and other database processing from the database server 120, while remaining transparent to the SQL processing and database applications. Database-aware storage server 150 processes data at the storage level and passes only what is needed to the database server 120.

In some embodiments, system software is installed on both database-aware storage server 150 and database server 120. The system software on database server 120 offloads some SQL processing from to database-aware storage server 150. The system software enables function shipping between the database instance and the underlying storage, in addition to traditional data shipping. Function shipping greatly reduces the amount of data processing that must be done by database server 120. Eliminating data transfers and database server workload can greatly benefit query processing operations that may become bandwidth constrained. Eliminating data transfers can also provide a significant benefit to online transaction processing (OLTP) systems that include large batch and report processing operations. In some embodiments, database-aware storage server 150 uses RDMA interconnections between client or database server 120 and database-aware storage server 150 to ensure low processing overhead.

Snapshot Databases

Traditionally, to clone databases in a production system, one would create a “test master” and snapshot databases in non-database-aware storage. In some cases, these databases are a full copy that consumes as much storage as its source. If a clone is a full copy of the production database, this is expensive in terms of the amount of storage consumed and the time it takes to create the clone. Furthermore, some system software features, such as Smart Scan, Smart Logging, and Smart Flash, are not available on non-database-aware storage systems.

Snapshots are ideal for creating space-efficient read-only or read-write clones of a database that can be used for development, testing, or other non-production purposes, and are ideal when multiple clones are required because of disk space and time savings. From a single source database, one can create multiple snapshots with minimal additional storage and minimal effort. Each snapshot database uses a small fraction of the disk space required for a full copy and can be created or dropped in seconds. Each snapshot is a logical copy of the source database. Creating a snapshot from the source database is as simple as recording the parent file name in the child file header, an operation that completes in seconds and requires minimal disk space. Additional disk space is consumed only when the user of the snapshot begins to change data. Only new data is written to data blocks that are allocated to the snapshot on write. All requests for data that has not changed are serviced by the data blocks of the source database. Multiple users can create independent snapshots from the same source database. This enables multiple development and test environments to share space while maintaining independent databases for each user.

In an embodiment, a snapshot is a thinly provisioned point-in-time copy of a file. The source file for a snapshot can be a regular file, a file clone, or another snapshot. In one embodiment, database-aware storage server 150 uses redirect-on-write techniques to create and maintain snapshots very quickly and space-efficiently. The snapshot creation process can work on an individual file or a collection of files.

As shown in FIG. 1, database-aware storage server 150 includes database 151 containing data file 161. A database consists of the following files: control files, online redo logs, temp files, and data files. In the depicted example, database 151 is an original database, referred to herein as a “master database,” such that the blocks A-E of data file 161 are stored in one or more storage devices from storage pool 110. Data file 161 may be a database file of database 151, such as a table, for example. The depicted example shows one data file 161 for illustrative purposes; however, database 151 may include many such data files.

Database-aware storage server 150 also includes database 152 containing sparse file 162. In the depicted example, database 152 is a snapshot of database 151. In some embodiments, a snapshot database has its own copy of control files, online redo logs, and temp files. These other database files are not sparse files. Database 152 includes a sparse file for each data file of database 151. A sparse file contains only changes made to blocks from the parent file (the parent file remains unchanged) and maintains a pointer to the parent file for access to unchanged data. In the depicted example, sparse file 162 has pointers to blocks A, B, C, and E in data file 161; however, block D has been changed. The data written to block D, shown as D', is stored in sparse file 162.

Figure 2:
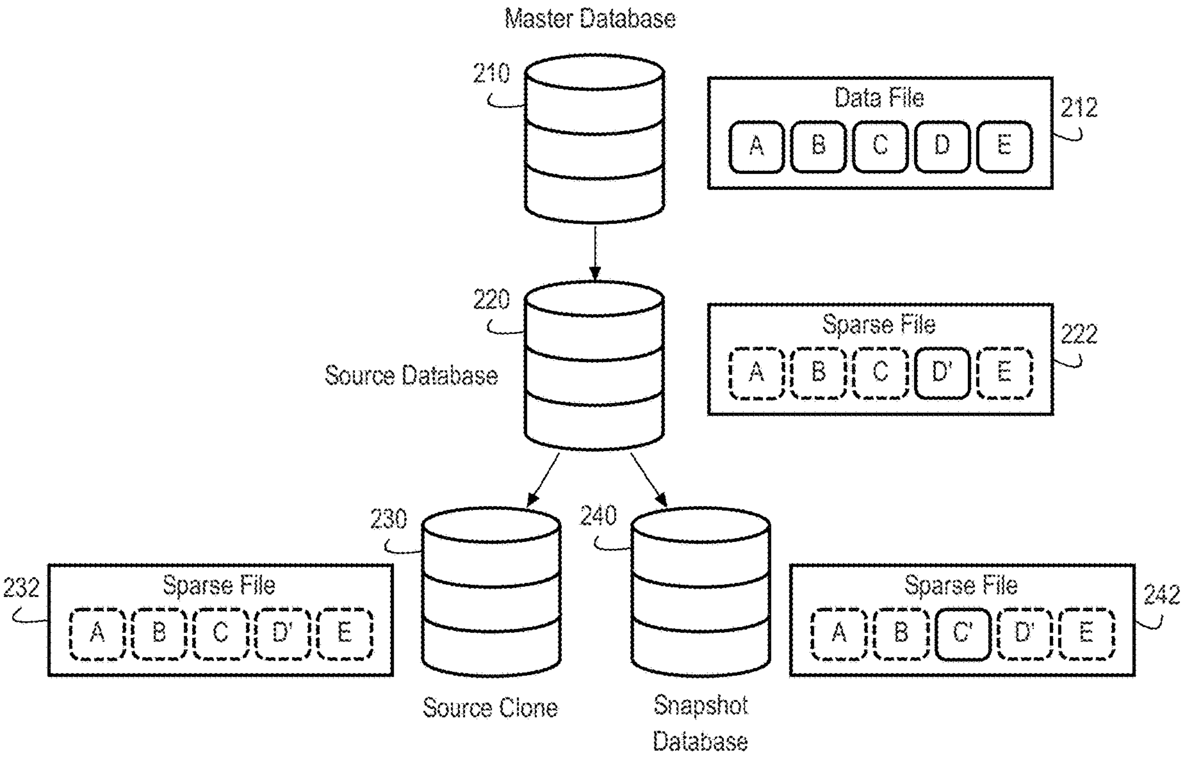
FIG. 2 illustrates snapshot creation with database cloning in accordance with an embodiment.

FIG. 2 illustrates snapshot creation with database cloning in accordance with an embodiment. In the depicted example, database 210 is a master database, such that the blocks A-E of data file 212 are stored in one or more storage devices. In practice, master database 210 may have many data files. Database 220 is a snapshot database of master database 210. Thus, database 220 includes sparse file 222 corresponding to data file 212. In the depicted example, sparse file 222 has pointers to blocks A, B, C, and E in data file 212; however, block D has been changed. The data written to block D, shown as D', is stored in sparse file 222. In this example, database 220 is a source database from which a clone and a snapshot are to be created.

In the example depicted in FIG. 2, two snapshots are created of source database 220: source clone 230 and snapshot database 240. This allows for two divergent databases to be created from the same source database. For example, one may split source database 220 into two separate databases, where source clone 230 is a logical copy of source database 220, referred to as a "thin clone" of source database 230, and snapshot database 240 is a logical copy of source database 220 with some intended modification. In one embodiment, during creation of source clone 230 and snapshot database 240, existing read and write operations may complete on source database 220. After the creation of the snapshot databases, reads and writes that would have targeted source database 220 would then target source clone 230. Source database 220 becomes a point-in-time logical copy of the database, frozen at the time of the snapshot creation, and subsequent operations would target source clone 230. Other database operations can be directed to snapshot database 240 to interact with the logical copy of source database 220 with the modification.

Source clone database 230 is a snapshot of source database 220 and contains sparse file 232, which corresponds to sparse file 222. Sparse file 232 has pointers to blocks A, B, C, D', and E of sparse file 222. In turn, sparse file 222 has pointers to blocks A, B, C, and E of data file 212. Thus, a read of the file from source clone 230 will result in reading block D' from sparse file 222 and reading blocks A, B, C, and E from data file 212. Data blocks are cached as high up in the hierarchy as possible. Thus, the block A is cached in association with master database 210, and data block D' is cached in association with source database 220. This improves data availability and data access performance.

Snapshot database 240 is a snapshot of source database 220 and contains sparse file 242, which corresponds to sparse file 222. Sparse file 242 has pointers to blocks A, B, D', and E of sparse file 222. In turn, sparse file 222 has pointers to blocks A, B, C, and E of data file 212. However, in snapshot database 240, data block C has been written to, resulting in block C' being written to sparse file 242. Thus, a read of the file from snapshot database 240 will result in reading block C' from sparse file 242, reading block D' from sparse file 222, and reading blocks A, B, and E from data file 212. Again, data blocks are cached as high up in the hierarchy as possible. Thus, data block A is cached in association with master database 210, data block D' is cached in association with source database 220, and data block C' is cached in association with snapshot database 240. This improves data availability and data access performance.

As mentioned previously, data are stored in a distributed storage system. For example, a data file may be distributed across 10 storage devices. Thus, the tracking of data must be point-in-time consistent across all storage devices in the distributed storage system.

Snapshot Tree

A "snapshot tree data structure" keeps track of the hierarchical relationship of all current snapshots on a database. For example, returning to FIG. 1, databases 151, 152 have a parent-child relationship, where database 151 is the parent of database 152, and database 152 is a child of database 151. In the example shown in FIG. 2, database 220 is a child of master database 210, and master database 210 is the parent of database 220. Both source clone 230 and snapshot database 240 are children of source database 220.

In the example shown in FIG. 1, databases 151, 152 may be only a portion of a larger hierarchy. These hierarchical relationships are stored in snapshot tree data structures. In some embodiments, a hierarchical tree may be maintained for each data file, and different data files may have different hierarchical relationships. For example, if a new file (e.g., a new table or index) is added to database 152 and not to database 151, then for that new file, database 151 will not be part of the hierarchy. In an embodiment, database 152 will contain the new data file where all data blocks are stored in one or more storage devices from storage pool 110.

With reference to FIG. 1, database-aware storage server maintains a cached version of the snapshot tree data structures 155. Any database server or client 120 that opens a specific database, or its snapshots, must have the snapshot tree data structures 125. When a new snapshot is created, such as snapshot database 152, database-aware storage server changes the snapshot tree data structures 155 and sends the updated snapshot tree data structures 155 to client or database server 120. Other changes to the snapshot tree data structures, such as removing a snapshot from the hierarchy, would also result in the updated snapshot tree data structures 155 being sent to client or database server 120.

Database-aware storage server 150 verifies any request from client or database server 120 based on the snapshot tree data structures 155. If client or database server 120 does not have the most up-to-date snapshot tree data structures, i.e., it has a stale version, then it must reopen the associated database file. This will cause database-aware storage server 150 to send the current snapshot tree data structures 155 to the client or database server 120. This is a loosely coupled way of maintaining the snapshot tree data structures 155, which makes updates and allows clients or database servers to correct themselves.

Database-aware storage server 150 allocates out of place for a write that comes to a location that does not exist, by consulting with the cached snapshot tree data structures 155. For read operations, database-aware storage server 150 uses the data blocks of the nearest parent allocation. This same mechanism is used for various cached data. Data allocations are co-located for a specific data block, irrespective of which snapshot database that allocation belongs to, as long as it belongs to the same data block on the file. This allows for consistent handling of storage failures, and movement of these data blocks as desired, with on-going input/output operations from the source database and multiple snapshot databases.

Figure 3:
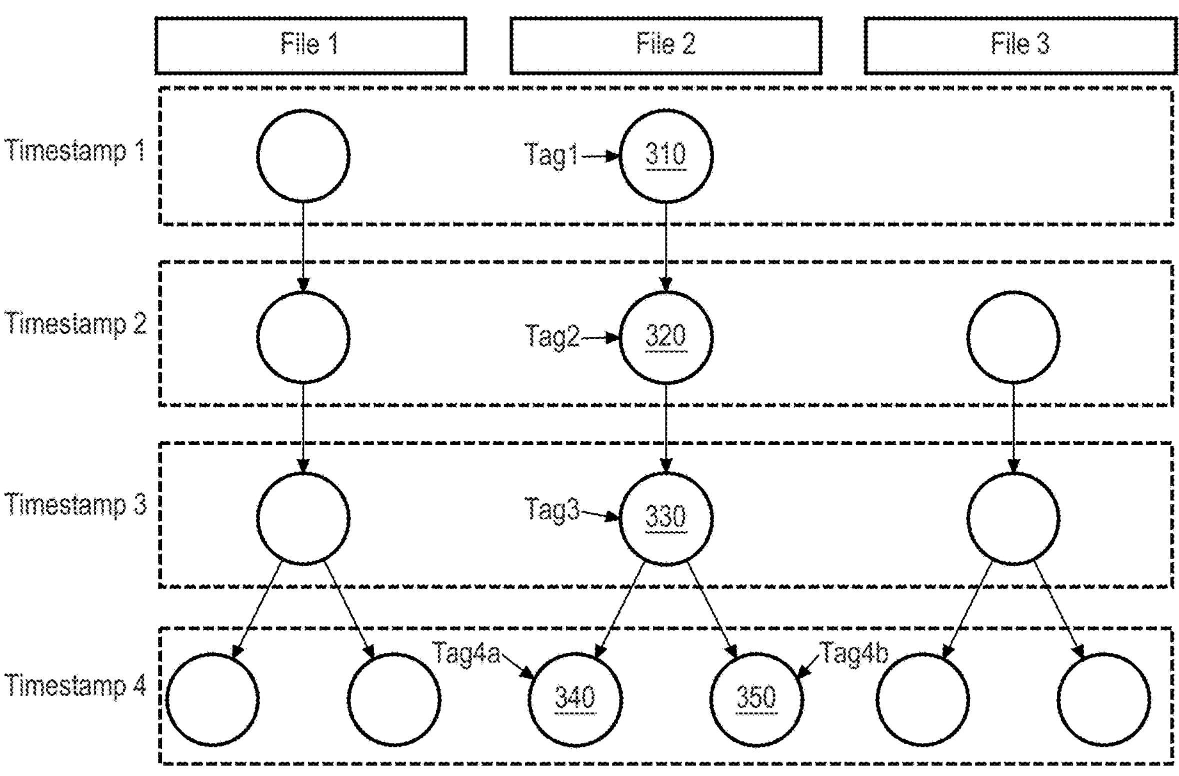
FIG. 3 illustrates snapshot tree data structures for multiple data files of a database in accordance with an embodiment.

FIG. 3 illustrates snapshot tree data structures for multiple data files of a database in accordance with an embodiment. As shown in FIG. 3, there is a snapshot tree data structure for each of file 1, file 2, and file 3. At timestamp 1, the database included file 1 and file 2, and the snapshot tree data structures for file 1 and file 2 included a single node. At timestamp 2, a snapshot database was created and file 3 was added to the database. Thus, at timestamp 3, the database included file 1, file 2, and file 3, and the snapshot tree data structures for file 1 and file 2 included two nodes, while the snapshot tree data structure for file 3 included one node. At timestamp 3, another snapshot database was created, which is reflected in the snapshot tree data structures of file 1, file 2, and file 3. At timestamp 4, two snapshots were created, and these snapshots are represented as nodes in the snapshot tree data structures of file 1, file 2, and file 3.

In an embodiment, the client or database server 120 specifies a file with a "tag" in a request to perform an operation, such as a read or write operation. A tag is a snapshot identifier. The snapshot identifier may be based on the timestamp. Thus, a request to perform an operation, such as a read operation, on file 2 may include tag1 to target the database at timestamp 1. Similarly, a request to perform a read operation on file 2 may include tag2 or tag3 to target the database at timestamp 2 or timestamp 3, respectively.

In some embodiments, leaf nodes of a snapshot tree data structure represent databases that are writable. For example, in the example shown in FIG. 3, after creation of source clone 340 and snapshot database 350, for example, databases 310, 320, 330 are read-only, and databases 330, 340 are read-write databases. A request from a client or database server 120 has a tag that indicates the target database. Thus, a request to perform a write operation on file 2 with tag2 would be invalid. The database-aware storage server 150 would allow write operations to databases 340 and 350. However, a request to perform a write operation to file 2 with a tag that targets database 310, database 320, or database 330 indicates that the client or database server 120 has stale snapshot tree data structures 125.

Thus, database-aware storage server 150 verifies requests from the client or database server 120 based on the snapshot tree data structures 155. If verification of a request is successful, then the database-aware storage server 150 performs the requested operation. If verification of a request fails, then database-aware storage server 150 notifies the client or database server 120 that the request failed verification. The client or database server 120 may respond by requesting the current snapshot tree data structures 155 and retry the request in response to receiving the current snapshot tree data structures 155. Alternatively, database-aware storage server 150 may send the current snapshot tree data structures 155 to a client or database server 120 that has stale snapshot tree data structures. The client or database server 120 can then retry the request in response to receiving the current snapshot tree data structures 155.

In the example shown in FIG. 3, a request to perform a write operation on file 2 with tag3 would fail verification. The client would request to open file 2 to perform a write operation with tag3, and the database-aware storage server 150 would determine that the client does not have the current snapshot tree data structures and verification would fail. However, a request to perform a write operation on file 2 with tag4a or tag4b would succeed, because database 340 and database 350 are represented as leaf nodes in the snapshot tree data structure. The client would request to open file 2 to perform a write operation with tag4a, for example, and the database-aware storage server 150 would determine that the client does have the current snapshot tree data structures and verification would succeed.

In one embodiment, the client (or database server) does a check based on the snapshot tree data structures cached at the client. The client performs a communication with the database-aware storage server in which information about the snapshot tree data structures is communicated between the client and the server. This information may be a tag of a leaf node or, in one embodiment, a version number of the snapshot tree data structures. If the database-aware storage server detects a disagreement in the information about the snapshot tree data structures, then verification fails.

Procedural Overview

Figure 4:
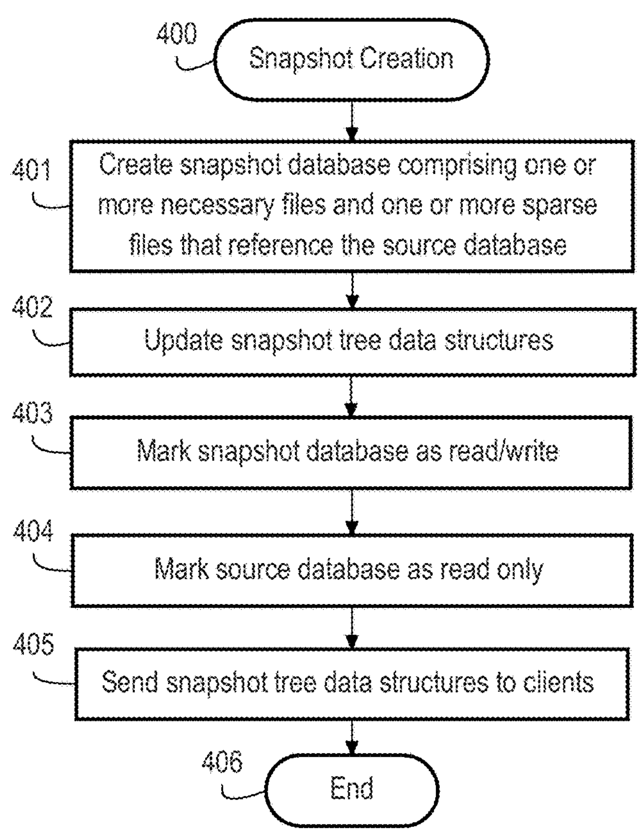
FIG. 4 is a flowchart illustrating operation of a database-aware storage server performing snapshot creation in accordance with an embodiment.

FIG. 4 is a flowchart illustrating operation of a database-aware storage server performing snapshot creation in accordance with an embodiment. Operation begins 400 with a request to create a snapshot of a source database (block 400). The database-aware storage server creates a snapshot database comprising one or more necessary files and one or more sparse files that reference the source database (block 401). The database updates the snapshot tree data structures (block 402), marks the snapshot database as read/write (block 403), and marks the source database as read only (block 404). Then, the database-aware storage server sends the updated snapshot tree data structures to clients (block 405). Thereafter, operation ends (block 406).

Figure 5:
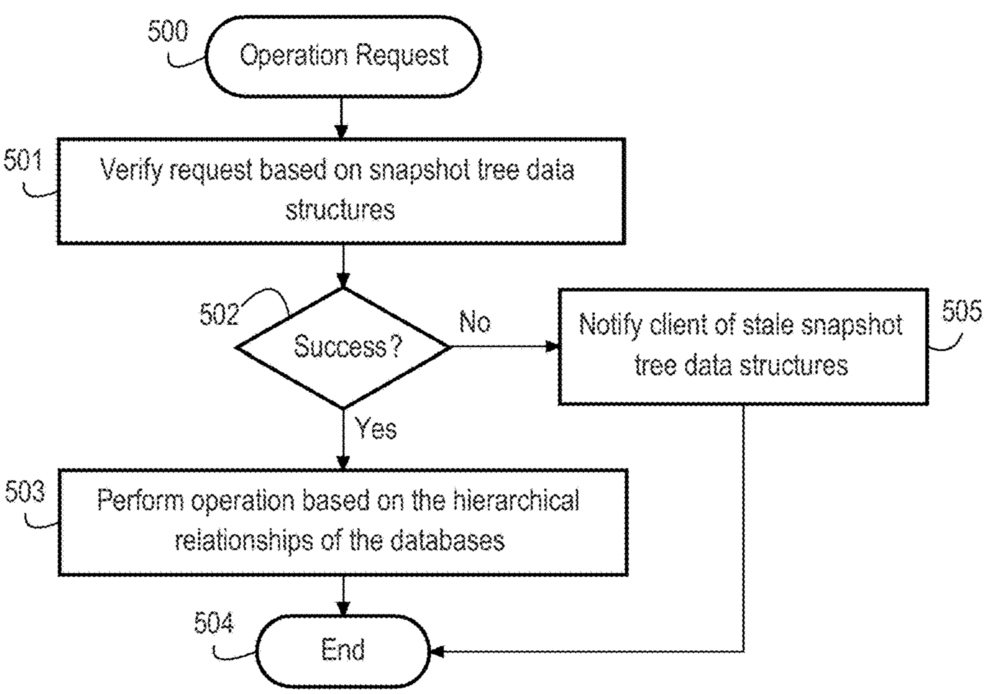
FIG. 5 is a flowchart illustrating operation of a database-aware storage server performing verification of a request to perform an operation on a database in accordance with an embodiment.

FIG. 5 is a flowchart illustrating operation of a database-aware storage server performing verification of a request to perform an operation on a database in accordance with an embodiment. Operation begins when a request to perform an operation is received from a client or database server (block 500). The database-aware storage server verifies the request based on snapshot tree data structures (block 501) and determines whether the verification succeeds (block 502). If verification succeeds (block 502: Yes), then the database-aware storage server performs the operation based on the hierarchical relationships of the databases, as represented in the snapshot tree data structures (block 503). Thereafter, operation ends (block 504).

If verification fails (block 502: No), then the database-aware storage server notifies the client of stale snapshot tree data structures (block 505). Thereafter, operation ends (block 504). The client or database server would then request the current snapshot tree data structures and retry the request.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
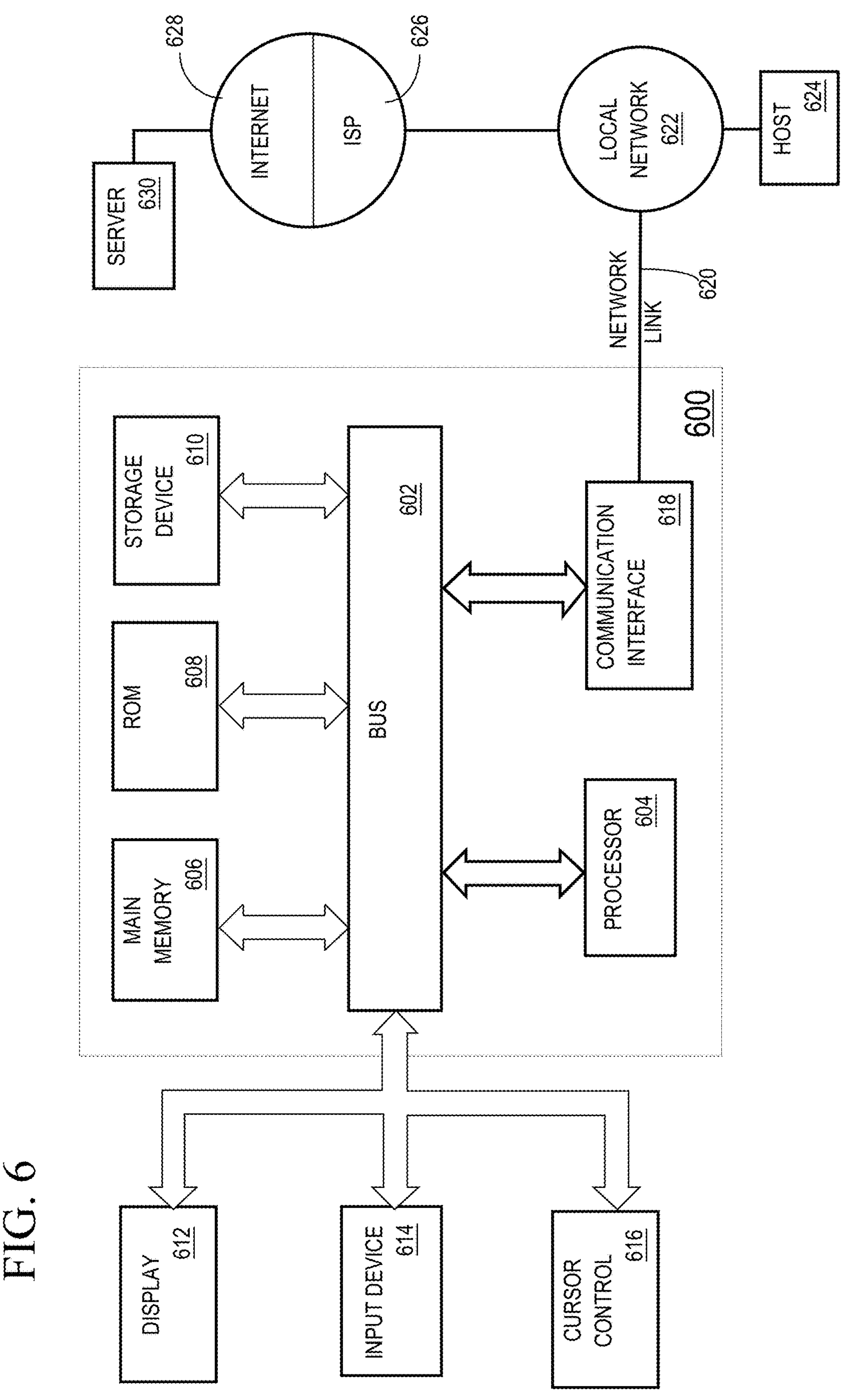
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computer system 600 upon which aspects of the illustrative embodiments may be implemented. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

maintaining a set of snapshot tree data structures, wherein the set of snapshot tree data structures corresponds to a plurality of files contained within a set of databases, and wherein each snapshot tree data structure corresponds to a given file within the plurality of files and represents hierarchical relationships of the set of databases containing the given file;

creating a new snapshot database from a source database within the set of databases, wherein:

the set of databases includes a master database, the master database comprises one or more data files, and the new snapshot database comprises one or more sparse files corresponding to the one or more data files;

updating the set of snapshot tree data structures to form an updated set of snapshot tree data structures that includes representation of the new snapshot database corresponding to the one or more data files;

in response to a request from a client to perform a database operation on a target database within the set of databases, performing a verification of the request based on the updated set of snapshot tree data structures; and in response to successful verification of the request, performing the database operation on the target database, wherein the method is performed by one or more computing devices.

2. The method of claim 1, wherein performing verification of the request comprises determining whether the client has the updated set of snapshot tree data structures.

3. The method of claim 2, further comprising providing the updated set of snapshot tree data structures to the client in response to failed verification of the request.

4. The method of claim 2, wherein determining whether the client has the updated set of snapshot tree data structures comprises determining whether the target database is represented as a leaf node in the updated set of snapshot tree data structures.

5. The method of claim 1, wherein the source database is writable during creation of the new snapshot database.

6. The method of claim 1, wherein the source database is the master database.

7. The method of claim 1, wherein the source database is a snapshot database comprising one or more sparse files corresponding to the one or more data files.

8. The method of claim 1, wherein updating the set of snapshot tree data structures comprises representing the new snapshot database as a child of the source database in the updated set of snapshot tree data structures.

9. The method of claim 1, wherein:

creating the new snapshot database comprises creating a clone of the source database and the new snapshot database, the clone of the source database is a snapshot database comprising a first set of one or more sparse files corresponding to the one or more data files, and the new snapshot database comprises a second set of one or more sparse files corresponding to the one or more data files, and updating the set of snapshot tree data structures comprises representing the clone of the source database and the new snapshot database as children of the source database in the updated set of snapshot tree data structures.

10. The method of claim 1, wherein the database operation comprises a database smart offload operation.

11. The method of claim 1, wherein:

the target database is the new snapshot database, the database operation comprises a write to at least one data block of a file of the target database, and performing the database operation comprises writing the at least one data block to a sparse file of the one or more sparse files.

12. The method of claim 1, wherein:

the target database is the new snapshot database, the database operation comprises creating a new file in the target database, and performing the database operation comprises adding the new file to the one or more sparse files.

13. The method of claim 1, wherein:

the target database is the new snapshot database, the database operation comprises a read from a file of the target database, and performing the database operation comprises reading a set of one or more data blocks from at least one of the one or more sparse files or the one or more data files.

14. One or more non-transitory computer-readable media storing instructions which, when executed by one or more processors, cause performance of:

maintaining a set of snapshot tree data structures, wherein the set of snapshot tree data structures corresponds to a plurality of files contained within a set of databases, and wherein each snapshot tree data structure corresponds to a given file within the plurality of files and represents hierarchical relationships of the set of databases containing the given file;

creating a new snapshot database from a source database within the set of databases, wherein:

the set of databases includes a master database, the master database comprises one or more data files, and the new snapshot database comprises one or more sparse files corresponding to the one or more data files;

updating the set of snapshot tree data structures to form an updated set of snapshot tree data structures that includes representation of the new snapshot database corresponding to the one or more data files;

in response to a request from a client to perform a database operation on a target database within the set of databases, performing a verification of the request based on the updated set of snapshot tree data structures; and in response to successful verification of the request, performing the database operation on the target database.

15. The one or more non-transitory computer-readable media of claim 14, wherein performing verification of the request comprises determining whether the client has the updated set of snapshot tree data structures.

16. The one or more non-transitory computer-readable media of claim 15, further comprising providing the updated set of snapshot tree data structures to the client in response to failed verification of the request.

17. The one or more non-transitory computer-readable media of claim 15, wherein determining whether the client has the updated set of snapshot tree data structures comprises determining whether the target database is represented as a leaf node in the updated set of snapshot tree data structures.

18. The one or more non-transitory computer-readable media of claim 14, wherein updating the set of snapshot tree data structures comprises representing the new snapshot database as a child of the source database in the updated set of snapshot tree data structures.

19. The one or more non-transitory computer-readable media of claim 14, wherein:

creating the new snapshot database comprises creating a clone of the source database and the new snapshot database, the clone of the source database is a snapshot database comprising a first set of one or more sparse files corresponding to the one or more data files, and the new snapshot database comprises a second set of one or more sparse files corresponding to the one or more data files, and updating the set of snapshot tree data structures comprises representing the clone of the source database and the new snapshot database as children of the source database in the updated set of snapshot tree data structures.

20. The one or more non-transitory computer-readable media of claim 14, wherein the database operation comprises a database smart offload operation.

* * * * *